United States Patent
Kotani et al.

(10) Patent No.: US 11,429,646 B2
(45) Date of Patent: Aug. 30, 2022

(54) NON-TRANSITORY COMPUTER-READABLE STORAGE MEDIUM STORING INFORMATION PRESENTATION PROGRAM, INFORMATION PRESENTATION DEVICE, AND INFORMATION PRESENTATION METHOD OF CONTROLLING TO DISPLAY INFORMATION REGARDING TROUBLE SHOOTING

(71) Applicant: FUJITSU LIMITED, Kawasaki (JP)

(72) Inventors: Ichiro Kotani, Nagoya (JP); Makoto Adachi, Akashi (JP); Takashi Maeda, Yokohama (JP); Takafumi Konno, Nagoya (JP); Kazuki Yamada, Nada (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/129,153

(22) Filed: Dec. 21, 2020

(65) Prior Publication Data

US 2021/0240743 A1 Aug. 5, 2021

(30) Foreign Application Priority Data

Jan. 30, 2020 (JP) .............................. JP2020-013758

(51) Int. Cl.
*G06F 16/28* (2019.01)
*G06F 16/2457* (2019.01)
(Continued)

(52) U.S. Cl.
CPC .............. *G06F 16/287* (2019.01); *G06F 7/08* (2013.01); *G06F 16/2365* (2019.01); *G06F 16/24578* (2019.01)

(58) Field of Classification Search
CPC .............. G06F 16/287; G06F 16/2365; G06F 16/24578; G06F 7/08
See application file for complete search history.

(56) References Cited

U.S. PATENT DOCUMENTS 8,090,717 B1 * 1/2012 Bharat ................. G06F 16/355
707/731
2006/0064394 A1 * 3/2006 Dettinger .............. G06F 16/382
(Continued)

FOREIGN PATENT DOCUMENTS

JP 2009-032024 A 2/2009
JP 2016-151929 A 8/2016

*Primary Examiner* — Alicia M Willoughby
(74) *Attorney, Agent, or Firm* — Fujitsu Patent Center

(57) ABSTRACT

A method includes: determining, based on an elapsed time, a priority for each of groups obtained by clustering a plurality of pieces of response information based on similarity between the pieces of response information, each response information indicating a response to an event that has occurred, the elapsed time being measured from a time period in which the event recorded in each response information of each group occurred most often; calculating credibility for each response information, based on a number of times specifications of a system relating to the event have been changed after the response, and an elapsed time from date and time when the response recorded in the pieces of response information has been made; and controlling a presentation mode upon presenting the plurality of pieces of response information, based on the priority calculated for each group and the credibility calculated for each response information.

9 Claims, 10 Drawing Sheets

(51) Int. Cl.
*G06F 7/08* (2006.01)
*G06F 16/23* (2019.01)

(56) References Cited

U.S. PATENT DOCUMENTS

| | | | |
|---|---|---|---|
| 2007/0219794 A1* | 9/2007 | Park | G06Q 10/10 |
| | | | 704/246 |
| 2009/0030716 A1 | 1/2009 | Namba | |
| 2009/0248665 A1* | 10/2009 | Garg | G06F 16/285 |
| 2012/0330969 A1* | 12/2012 | Estrada Guadarrama | |
| | | | G06F 16/24578 |
| | | | 707/748 |
| 2017/0024395 A1* | 1/2017 | Michelson | G06F 16/287 |
| 2017/0351677 A1* | 12/2017 | Chaubal | G06F 16/24578 |
| 2018/0143980 A1* | 5/2018 | Tanikella | G06F 16/24578 |
| 2018/0322509 A1* | 11/2018 | Walthers | G06F 40/279 |
| 2019/0251087 A1* | 8/2019 | Lin | G06F 16/9535 |

\* cited by examiner

FIG. 2

| RESPONSE ID | EVENT CONTENTS | RESPONSE CONTENTS | OCCURRENCE DATE | SOLUTION DATE | TARGET SYSTEM NAME/FUNCTION NAME | REFERENCE RESPONSE INFORMATION | ... |
|---|---|---|---|---|---|---|---|
| Q0100 | xxxxx | xxxxx | 2019/01/10 | 2019/01/12 | A SYSTEM/B FUNCTION | Q0015 | |
| ... | | | | | | | |

| TARGET SYSTEM NAME/FUNCTION NAME | CHANGE CONTENTS | CHANGE IMPLEMENTATION DATE | ... |
|---|---|---|---|
| A SYSTEM/B FUNCTION | xxxxx | 2019/02/01 | |
| A SYSTEM/B FUNCTION | xxxxx | 2019/04/01 | |
| | | | |

| GROUP ID | RESPONSE TIME EVALUATION VALUE | PREVALENCE EVALUATION VALUE | PRIORITY |
|---|---|---|---|
| G0050 | V1 | V2 | S1 |
| ... | | | |

24

| RESPONSE ID | EVENT CONTENTS | RESPONSE CONTENTS | GROUP ID | REFERENCE COUNT EVALUATION VALUE | CHANGE RISK EVALUATION VALUE | FRESHNESS EVALUATION VALUE | CREDIBILITY |
|---|---|---|---|---|---|---|---|
| Q0100 | xxxxx | xxxxx | G0050 | V3 | V4 | V5 | S2 |
| ... | | | | | | | |

NON-TRANSITORY COMPUTER-READABLE STORAGE MEDIUM STORING INFORMATION PRESENTATION PROGRAM, INFORMATION PRESENTATION DEVICE, AND INFORMATION PRESENTATION METHOD OF CONTROLLING TO DISPLAY INFORMATION REGARDING TROUBLE SHOOTING

CROSS-REFERENCE TO RELATED APPLICATION

This application is based upon and claims the benefit of priority of the prior Japanese Patent Application No. 2020-13758, filed on Jan. 30, 2020, the entire contents of which are incorporated herein by reference.

FIELD

The embodiment discussed herein is related to a non-transitory computer-readable storage medium storing an information presentation program, an information presentation device, and an information presentation method.

BACKGROUND

In the prior art, for example, problems in information and communication technology (ICT) systems and the like and inquiries from users are managed as incidents, and system operators make responses such as taking measures against the problems and answering the inquiries. By recording such responses to incidents and accumulating useful information as knowledge such as frequently asked questions (FAQ), the accumulated knowledge can be utilized as a reference when later incidents are responded. Furthermore, by disclosing the knowledge to the users, the users are also allowed to try to personally solve the problems by referring to the knowledge before making an inquiry to the operator.

As a technology that supports the creation of knowledge as described above, a technology of summing up dealing times relevant to respective similar dealing contents stored in a storage unit and calculating a summed dealing time for each of similar dealing content items obtained by collecting similar dealing contents into one item has been proposed. This technology determines the knowledge creation order such that knowledges about similar dealing content items are created in descending order of summed dealing times.

Examples of the related art include Japanese Laid-open Patent Publication No. 2009-32024.

SUMMARY

According to an aspect of the embodiments, provided is a non-transitory computer-readable storage medium storing a program which causes a processor to perform processing. In an example, the processing includes: determining a priority for each of groups by using an elapsed time, the groups being obtained by clustering a plurality of pieces of response information based on similarity between the pieces of response information, each response information indicating a response to an event that has occurred, the elapsed time being measured from a time period in which the event recorded in each of the pieces of response information included in each of the groups occurred most often; calculating credibility for each of the pieces of response information by using a first value and a second value, the first value being a number of times specifications of a system relating to the event have been changed after the response, the second value being an elapsed time from date and time when the response recorded in the pieces of response information has been made; and controlling a presentation mode upon presenting all or a part of the plurality of pieces of response information, based on the priority calculated for each of the groups and the credibility calculated for each of the pieces of response information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a response information database (DB);

FIG. 3 is a diagram illustrating an example of a change information DB;

FIG. 7 is a diagram illustrating an example of a presentation information DB;

DESCRIPTION OF EMBODIMENT(S)

However, picking up response information to be accumulated as knowledge from response information that records past response contents and prioritizing the picked-up response information are performed by, for example, an expert with a lot of experience, which is thus a heavy human work burden.

As in the prior art, it is also conceivable to collect similar response information into one group and create knowledge for each group. However, when the number of pieces of past response information is enormous, the number of groups increases and the number of pieces of response information included in each group also increases. In this case, the work of picking up a group for which knowledge is to be created and the work of picking up response information to be accumulated as knowledge from response information included in each group is a heavy human work burden, as in the above-mentioned case.

In one aspect, the disclosed technology aims to present useful information that supports the creation of knowledge based on past response information.

Hereinafter, an exemplary embodiment according to the disclosed technology will be described with reference to the drawings.

Figure 1:
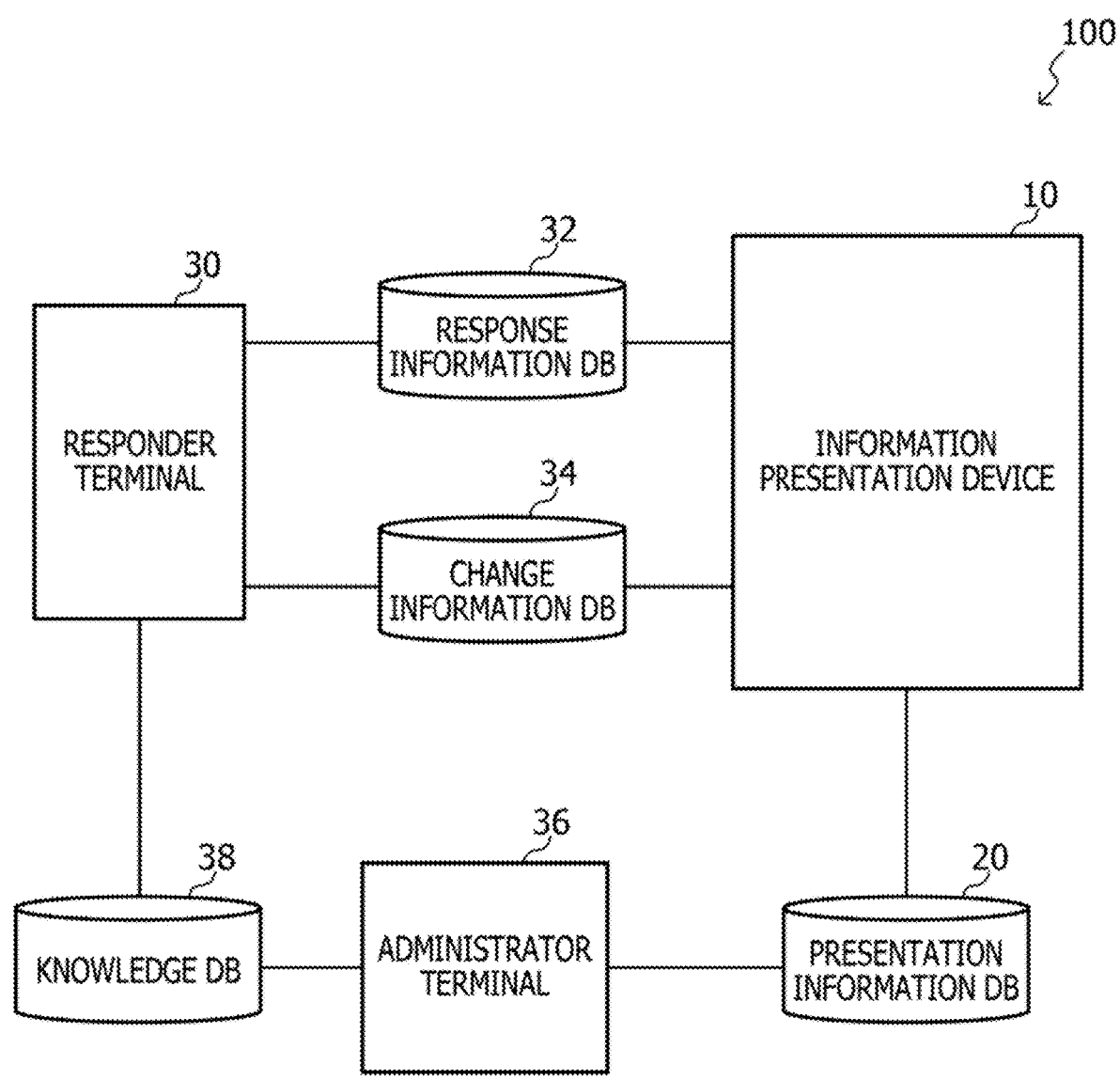
FIG. 1 is a block diagram illustrating a schematic configuration of a response support system according to the present embodiment.

As illustrated in FIG. 1, a response support system 100 according to the present embodiment includes an information presentation device 10, a responder terminal 30, and an administrator terminal 36.

First, an outline of the response to an event and the creation of knowledge in the response support system 100 will be described.

When an event such as an inquiry from a user regarding a target system such as an information and communication technology (ICT) system occurs, a responder on the system operation side responds to this event. The responder uses the responder terminal 30 to record the contents of the response and store the recorded contents in a response information database (DB) 32 as response information.

FIG. 2 illustrates an example of the response information DB 32. In the example in FIG. 2, each row (each record) corresponds to response information for one event. Each piece of response information includes, for example, information such as "response identification (ID)", "event contents", "response contents", "occurrence date", "solution date", "target system name/function name", and "reference response information".

"Response ID" denotes identification information on each piece of response information. "Event contents" denote the contents of the event that has occurred. For example, when the event is an inquiry from a user, the contents of the inquiry are stored as the event contents. Furthermore, when the event is a system problem, an error message, log information, and the like output from the system are stored as the event contents. "Response contents" denote the contents of the response made by the responder. Examples of "response contents" include the contents of the answer to the inquiry, the contents of the measure taken on the system, and the like.

"Occurrence date" denotes the date when the event occurred, examples of which include the date when the inquiry from the user was received, the date when the problem was detected in the system, and the like. "Solution date" denotes the date when the event was solved, examples of which include the date when the answer was transmitted, the date when the problem in the target system was resolved owing to the measure taken by the responder, and the like. "Target system name/function name" denotes the name of the target system and the name of the function. "Reference response information" denotes the response ID of past response information that the responder referred to when responding to the event. Note that, when a plurality of pieces of response information was referred to, the response IDs of all pieces of the referred response information may be recorded as reference response information, or the response ID of response information that was most helpfully referred to may be recorded as reference response information.

Furthermore, when the specifications or the like of the function of the target system have been changed as a response to the event, the responder uses the responder terminal 30 to record the change of the target system in the history and store the recorded history in the change information DB 34 as change information.

FIG. 3 is a diagram illustrating an example of the change information DB 34. In the example in FIG. 3, each row (each record) corresponds to change information indicating one change. Each piece of change information includes information such as "target system name/function name", "change contents" indicating the contents of the change made by the responder, and "change implementation date" that denotes the date when the responder implemented the change.

The information presentation device 10 periodically gathers information from the response information DB 32 and the change information DB 34, and creates information useful for creating knowledge to output the created information as presentation information. The presentation information output from the information presentation device 10 is stored in a presentation information DB 20.

An administrator on the target system operation side uses the administrator terminal 36 to refer to the presentation information stored in the presentation information DB 20, and picks up the response information to be employed as a reference at the time of future response, from the past response information, to store the picked-up response information in a knowledge DB 38 as knowledge. The knowledge stored in the knowledge DB 38 is referred to when the responder responds to an event.

Figure 4:
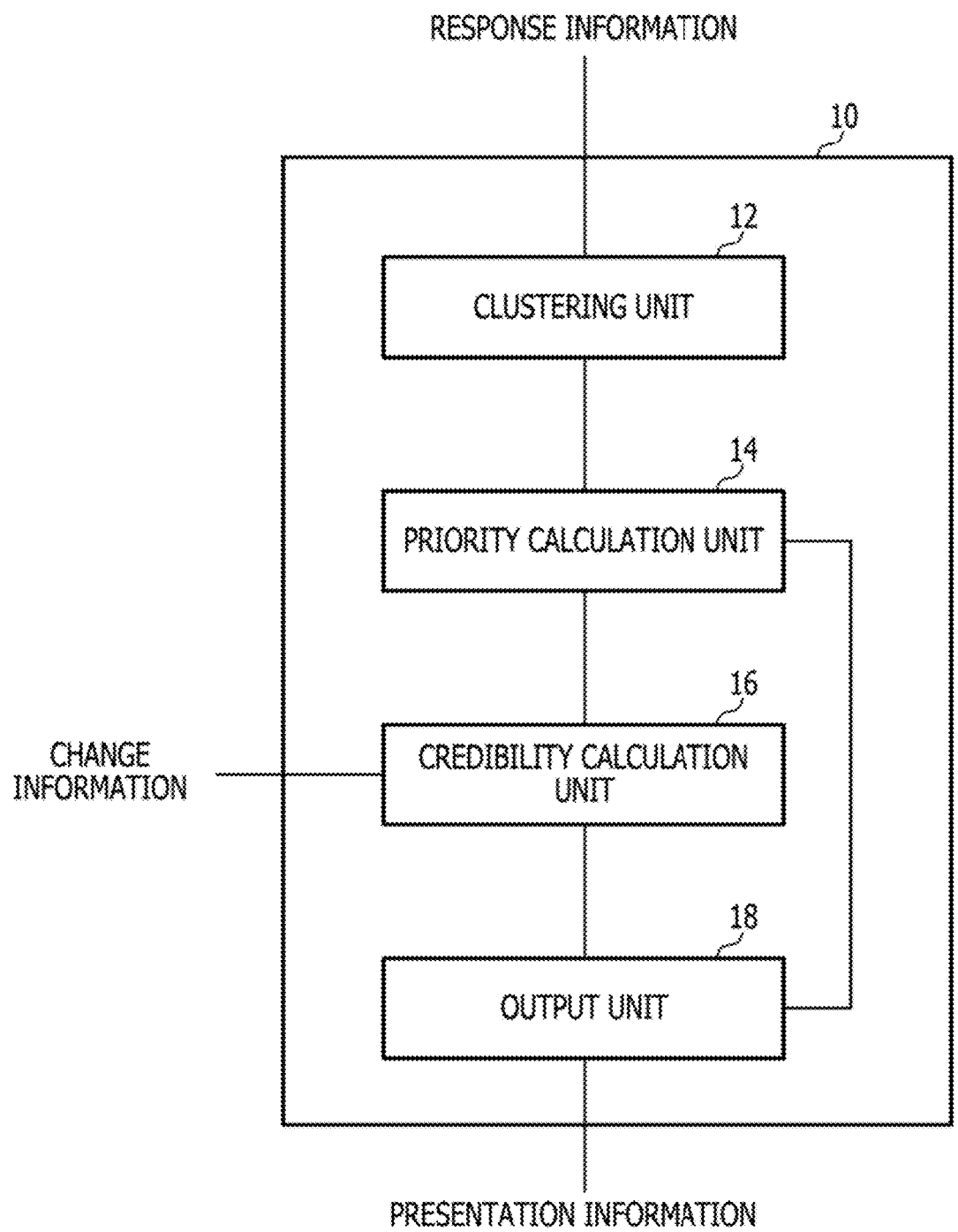
FIG. 4 is a functional block diagram of an information presentation device according to the present embodiment.

Next, the information presentation device 10 according to the present embodiment will be described in detail. As illustrated in FIG. 4, the information presentation device 10 functionally includes a clustering unit 12, a priority calculation unit 14, a credibility calculation unit 16, and an output unit 18. Note that the priority calculation unit 14 is an example of a priority determination unit of the disclosed technology, and the output unit 18 is an example of a control unit of the disclosed technology.

The clustering unit 12 acquires, from the response information DB 32, a plurality of pieces of past response information stored in the response information DB 32, and clusters the acquired plurality of pieces of response information based on the similarity between the pieces of response information to classify the pieces of response information into groups.

For example, the clustering unit 12 morphologically analyzes each piece of response information, and extracts a predetermined word such as a word whose part of speech is a noun, a content word, or a word registered in a dictionary defined beforehand. Furthermore, the clustering unit 12 extracts a feature amount such as term frequency (TF)-inverse document frequency (IDF) for each extracted word, and vectorizes each piece of response information using the extracted feature amount. Then, the clustering unit 12 groups, for example, pieces of response information indicated by vectors whose cosine similarity between the vectors is equal to or less than a predetermined threshold value.

The clustering unit 12 assigns a group ID, which is identification information on the group, to each group, and associates each piece of response information with the group ID of the group to which the each piece of response information belongs, and transfers the associated response information to the priority calculation unit 14.

The priority calculation unit 14 calculates, for each of the groups obtained by the clustering unit 12, a priority for specifying a group for which knowledge is desired to be created preferentially among the plurality of groups. A higher priority indicates a higher possibility that the response information included in the group with the higher priority will be useful as knowledge.

For example, the priority calculation unit 14 calculates a priority including a prevalence evaluation value based on the elapsed time from a time period in which an event recorded in each piece of response information included in each group occurred most often, and a response time evaluation value based on the total of the times from the occurrence of the event to the completion of the response. The prevalence evaluation value is an evaluation value assuming that the knowledge is expected to have more effectiveness when, for example, the knowledge is created from a group that contains response information about an event that have recently occurred more often than a group that contains response information about an event that often occurred one year ago. The response time evaluation value is an evaluation value for raising the priority of knowledge creation, because it is preferable to quickly prepare knowledge for an event that occurs frequently or an event that takes some time to respond.

Figure 5:
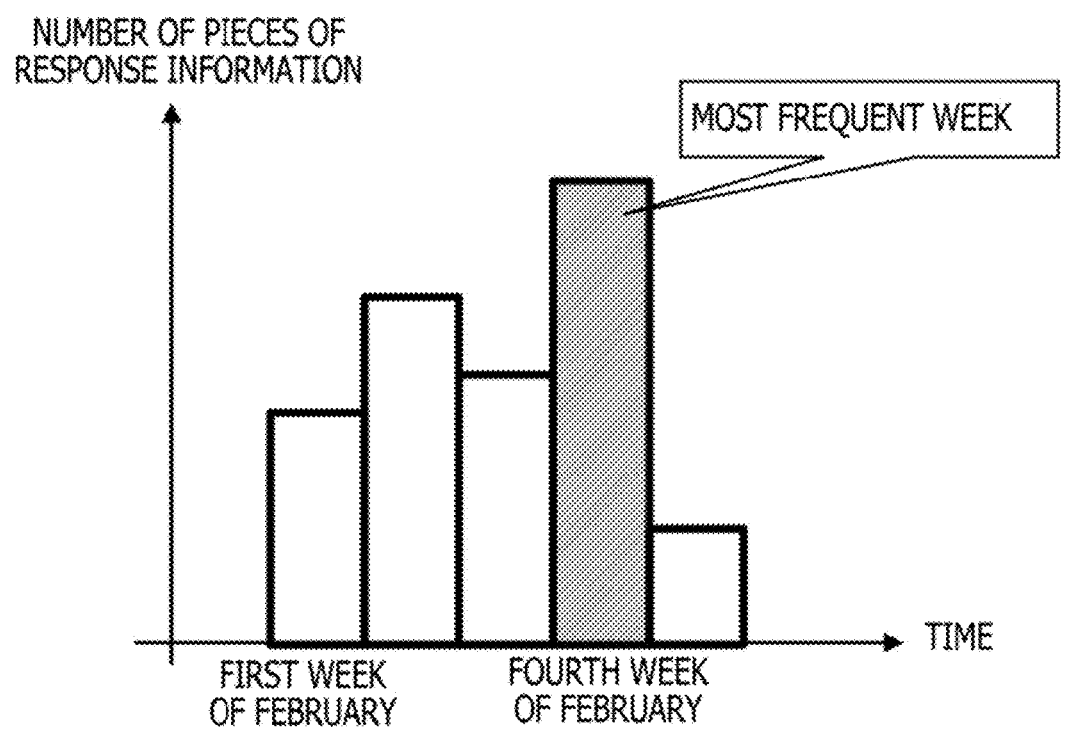
FIG. 5 is a diagram for explaining the calculation of a prevalence evaluation value.

For example, the priority calculation unit 14 aggregates the number of pieces of response information in units of predetermined periods (for example, units of one week) based on "occurrence date" of the response information included in each group, and specifies the time period in which the event occurred most often (hereinafter referred to as "most frequent time period"). FIG. 5 illustrates an example in which the number of pieces of response information is aggregated, for example, in units of one week and a week in which the event occurred most often (most frequent week) is specified.

Figure 6:
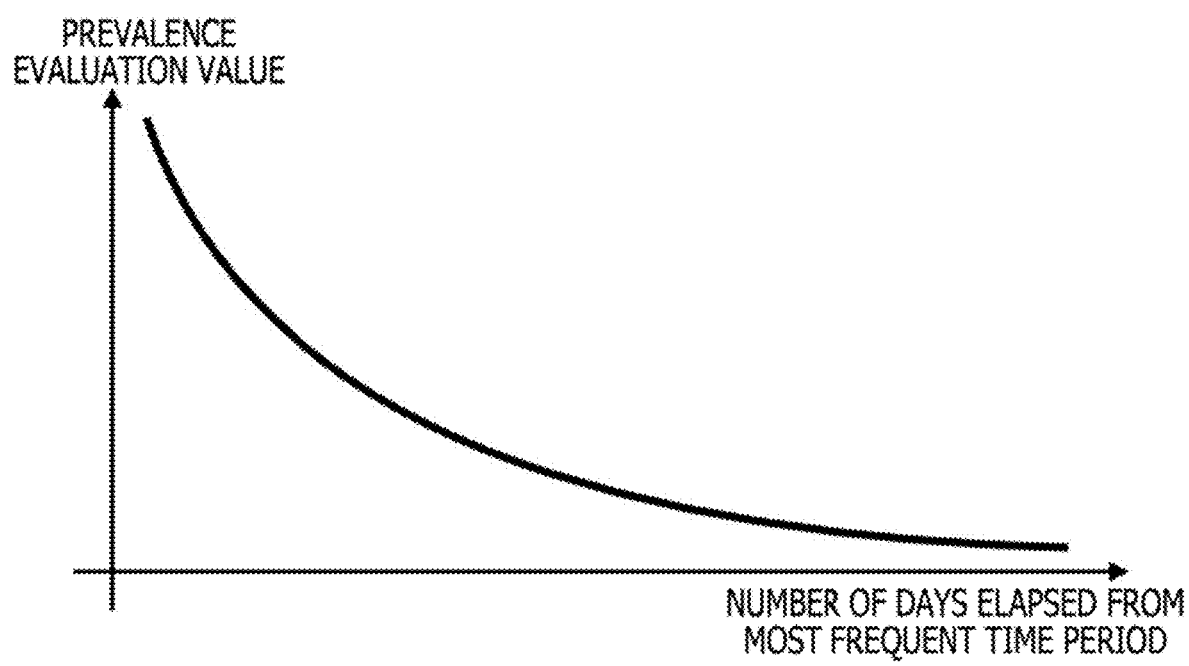
FIG. 6 is a diagram illustrating an example of the prevalence evaluation value.

The priority calculation unit 14 finds the difference between the specified most frequent time period and the current date and time as the number of days elapsed from the most frequent time period, and calculates the prevalence evaluation value, which becomes higher as the number of days elapsed from the most frequent time period becomes shorter and becomes lower as the number of elapsed days becomes longer. For example, the priority calculation unit 14 can calculate the prevalence evaluation value as indicated by following formula (1) and FIG. 6.

$$\text{Prevalence Evaluation Value}=1+\log[1/a]X \quad (1)$$

Note that a denotes a threshold value for the number of elapsed days (for example, 365 days) after which the contents of the response information are no longer employed as a reference, and X denotes the number of days elapsed from the most frequent time period.

Furthermore, the priority calculation unit 14 calculates the response time evaluation value, which becomes higher as the number of pieces of response information included in the group becomes larger and the time taken for the response indicated by each piece of response information (hereinafter, referred to as "response time") becomes longer. For example, the priority calculation unit 14 subtracts "occurrence date" from "solution date" of each piece of response information included in each group to find the response time of each piece of response information, and calculates the response time evaluation value by totaling the response times of the pieces of response information in the group. Totaling the response times of respective pieces of response information allows to calculate the evaluation value in consideration of both of the number of pieces of response information included in the group and the length of the response time of each piece of response information. That is, this enables to raise the priority of a group containing response information about not only an event that merely has a large number of inquiries and the like, but also an event for which the response takes some time.

The priority calculation unit 14 calculates the priority of each group such that the higher the prevalence evaluation value and the higher the response time evaluation value, the higher the priority. For example, the priority calculation unit 14 can calculate the priority by multiplying the prevalence evaluation value and the response time evaluation value. Furthermore, the priority calculation unit 14 may calculate the priority by a weighted sum of the prevalence evaluation value and the response time evaluation value. The priority calculation unit 14 transfers each piece of response information associated with the group ID and the calculated priority of each group to the credibility calculation unit 16 and the output unit 18.

The credibility calculation unit 16 calculates, for each piece of response information, a credibility indicating to what degree the response information is desired to be employed as a reference when knowledge is created. For example, the credibility calculation unit 16 calculates a credibility including a reference count evaluation value, a change risk evaluation value, and a freshness evaluation value. Hereinafter, each evaluation value will be described.

The reference count evaluation value is an evaluation value based on the number of times each piece of response information was referred to when another event was responded. The credibility calculation unit 16 counts, for each piece of response information, the number of times the response ID of the concerned response information is recorded in the "reference response information" column of other response information, and sets the counted number of times as the reference count evaluation value.

The change risk evaluation value is evaluation based on the number of times the specifications of the target system were changed after the response. The change risk evaluation value is an evaluation value for lowering the credibility according to the number of times of the target system function change after the response, considering that, when the function of the target system is changed, the contents of the response made before the function change is highly likely to be no longer used due to the specification change or the like. The credibility calculation unit 16 specifies "solution date" and "target system name/function name" for each piece of response information. The credibility calculation unit 16 acquires the change information stored in the change information DB 34, and among pieces of the change information, counts the number of pieces of change information having the same "target system name/function name" since "solution date" of the concerned response information specified by "change implementation date", to set the counted number as the change risk evaluation value.

For example, referring to the change information in the change information DB 34 illustrated in FIG. 3 for response information with the response ID=Q0100 stored in the response information DB 32 illustrated in FIG. 2, "A system/B function" has been changed twice since the solution date=2019/01/12. Therefore, in this case, the change risk evaluation value is given as 2.

The freshness evaluation value is an evaluation value based on the elapsed time from the date and time when the response recorded in the response information was made. For example, the answer contents, expressions, and the like for the same event are likely to vary also due to alterations outside the target system, such as operating system (OS) specifications. For this reason, the freshness evaluation value is an evaluation value for raising the credibility of the response information having a newer solution date and lowering the credibility with the lapse of time.

For example, the credibility calculation unit 16 finds the difference between "solution date" of the response information and the current date and time as the number of days elapsed from the solution date, and calculates the freshness evaluation value, which becomes higher as the number of days elapsed from the solution date becomes shorter and becomes lower as the number of elapsed days becomes longer. For example, the credibility calculation unit 16 can calculate the freshness evaluation value in the same manner as the above-mentioned prevalence evaluation value (formula (1) and FIG. 6). In this case, X in formula (1) denotes the number of days elapsed from the solution date.

The credibility calculation unit 16 calculates the credibility of each piece of response information such that the higher the reference count evaluation value, the higher the credibility, the higher the change risk evaluation value, the lower the credibility, and the higher the freshness evaluation value, the higher the credibility. For example, the credibility calculation unit 16 can calculate the credibility as indicated by following formula (2).

$$\text{Credibility} = w1 \times \text{Reference Count Evaluation Value} - w2 \times \text{Change Risk Evaluation Value} + w3 \times \text{Freshness Evaluation Value} \quad (2)$$

In formula (2), w1 denotes a reference count weighting coefficient, w2 denotes a change risk weighting coefficient, and w3 denotes a freshness weighting coefficient. The respective weighting coefficients may be equally set to 1, or when the evaluation value that is emphasized is changed depending on the target system, the weighting coefficient relevant to the concerned evaluation value to be emphasized may be made greater than the other weighting coefficients. Furthermore, the credibility calculation unit 16 may calculate the credibility by subtracting the change risk evaluation value from the value obtained by multiplying the reference count evaluation value and the freshness evaluation value.

The credibility calculation unit 16 may calculate the credibility for all pieces of the acquired response information, or may calculate the credibility for the response information included in a group whose priority, which is a priority given to each group transferred from the priority calculation unit 14, is higher than a priority criterion defined beforehand. The credibility calculation unit 16 transfers the credibility calculated for each piece of response information to the output unit 18.

The output unit 18 outputs the presentation information including the priority of each group transferred from the priority calculation unit 14 and the credibility of each piece of response information transferred from the credibility calculation unit 16. The output presentation information is stored in the presentation information DB 20.

FIG. 7 illustrates an example of the presentation information DB 20. In the example in FIG. 7, the presentation information DB 20 includes a priority table 22 and a credibility table 24. In the priority table 22, "group ID" and "priority" of each group are stored in association with each other for each group. Furthermore, in the example in FIG. 7, the priority table 22 also includes "response time evaluation value" and "prevalence evaluation value" calculated at the time of calculating each priority. In this case, each evaluation value is supposed to have been transferred to the output unit 18 from the priority calculation unit 14 together with the priority.

In the credibility table 24, "response ID" and "credibility" of each piece of response information are stored in association with each other for each piece of response information. Furthermore, in the example in FIG. 7, the credibility table 24 also includes "reference count evaluation value", "change risk evaluation value", and "freshness evaluation value" calculated at the time of calculating each value of credibility. In this case, each evaluation value is supposed to have been transferred to the output unit 18 from the credibility calculation unit 16 together with the credibility. Moreover, in the example in FIG. 7, the credibility table 24 also includes "event contents" and "response contents" of each piece of response information, and "group ID" of a group to which each piece of response information belongs.

The output unit 18 is capable of outputting the presentation information including the priorities of all the groups and the credibility of all pieces of response information. Furthermore, the output unit 18 may output the presentation information about response information that is included in a group whose priority is higher than the priority criterion and whose credibility is higher than a credibility criterion defined beforehand. In addition, the output unit 18 may output a predetermined number of pieces of response information having higher-ranked credibility among pieces of response information included in each group. Besides, the output unit 18 may sort pieces of response information in descending order of the priorities of groups to which the pieces of response information belong and in descending order of the credibility of the pieces of response information, to output.

Figure 8:
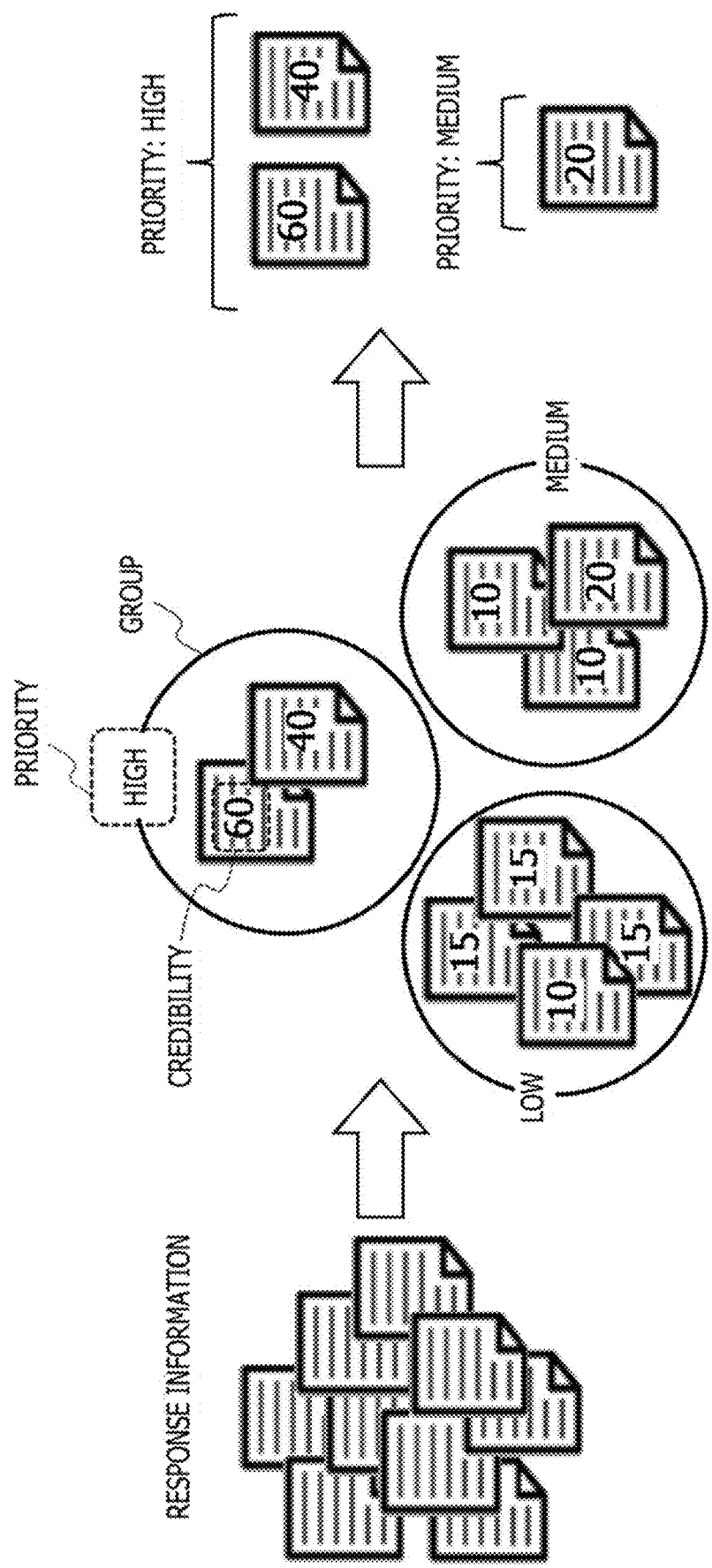
FIG. 8 is a diagram for explaining the calculation of priority and credibility and the output of presentation information.

FIG. 8 schematically illustrates the calculation of the priority and credibility, and the output of the presentation information. As illustrated in FIG. 8, the response information is grouped by the similarity, and the priority is calculated for each group. Note that, in the example in FIG. 8, each piece of response information is represented by a mark with the icon of a document, whereas the priority is represented by three levels of high, medium, and low. Furthermore, the credibility is calculated for each piece of response information. In the example in FIG. 8, a number shown superimposed on the mark indicating the response information represents the credibility. By outputting this presentation information including the priority and the credibility, the information is made useful when a group for which the creation of knowledge is desired to be prioritized is picked up and response information that is desired to be employed as knowledge is picked up from the picked-up group.

The presentation information stored in the presentation information DB 20 can be displayed on the administrator terminal 36 as a dashboard. The administrator is allowed to work on the administrator terminal 36 to narrow down the response information on the basis of the priority and the credibility and examine whether or not to store the response information in the knowledge DB 38. For example, the administrator can designate the priority and credibility so as to ensure that, for example, the priority is high or medium and the credibility has 20 or more, and as illustrated in the example in FIG. 8, can narrow down the response information to check the contents of each piece of response information.

Note that, in the credibility calculation unit 16 and the output unit 18 of the information presentation device 10, when the presentation information is output in a state in which the presentation information has already been narrowed down using the priority criterion and the credibility criterion, all pieces of the output presentation information may be displayed on the administrator terminal 36. In addition, further narrowing down the narrowed-down and output presentation information may be enabled.

Figure 9:
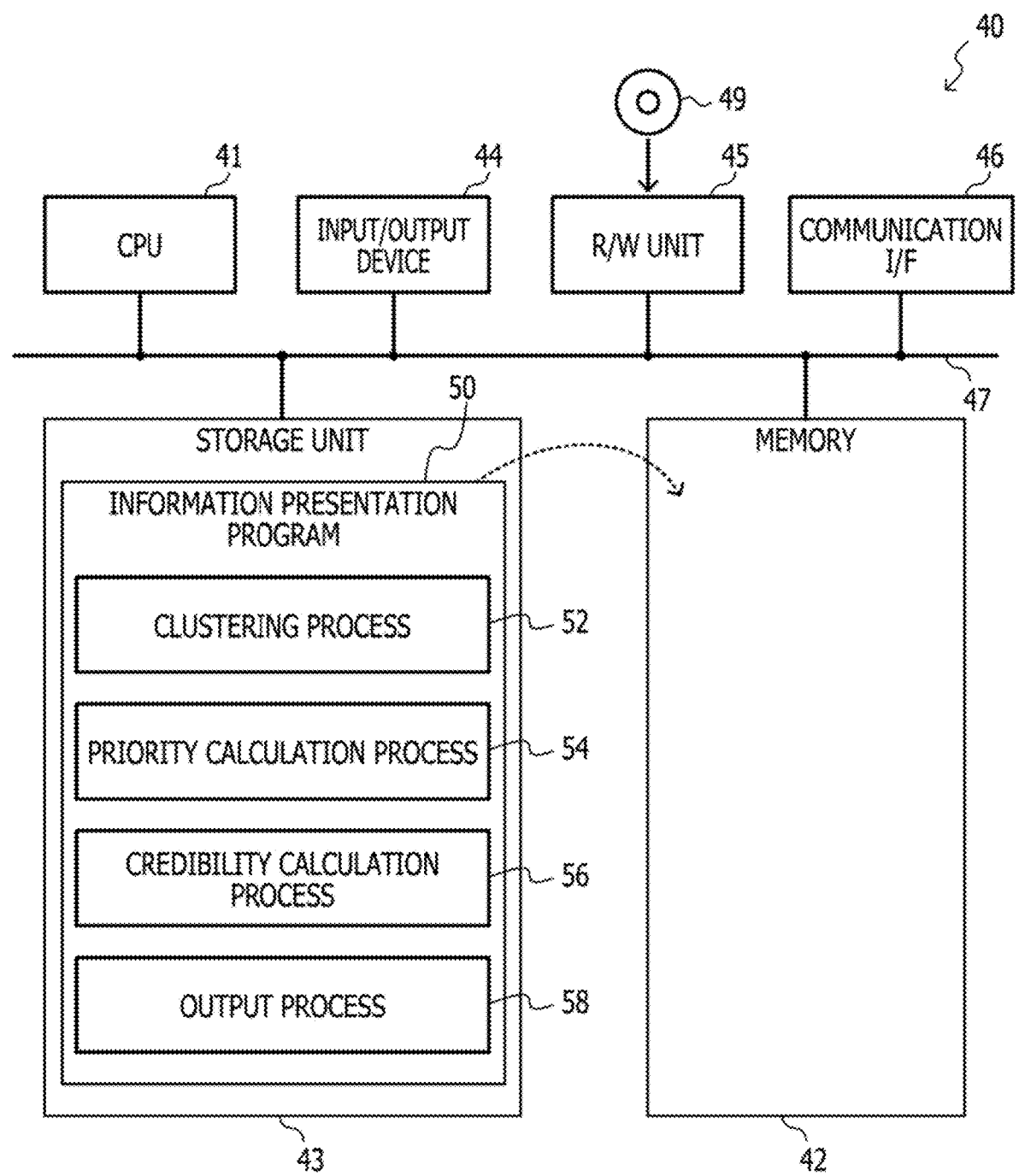
FIG. 9 is a block diagram illustrating a schematic configuration of a computer that functions as the information presentation device according to the present embodiment.

The information presentation device 10 can be achieved, for example, by a computer 40 illustrated in FIG. 9. The computer 40 includes a central processing unit (CPU) 41, a memory 42 as a temporary storage area, and a nonvolatile storage unit 43. The computer 40 also includes an input/output device 44 such as an input unit and a display unit, a read/write (R/W) unit 45 that controls reading and writing of data to and from a storage medium 49. Furthermore, the computer 40 includes a communication interface (I/F) 46 connected to a network such as the Internet. The CPU 41, the memory 42, the storage unit 43, the input/output device 44, the R/W unit 45, and the communication I/F 46 are connected to each other via a bus 47.

The storage unit 43 can be achieved by a hard disk drive (HDD), a solid state drive (SSD), a flash memory, or the like. The storage unit 43 as a storage medium stores an information presentation program 50 for causing the computer 40 to function as the information presentation device 10. The information presentation program 50 has a clustering process 52, a priority calculation process 54, a credibility calculation process 56, and an output process 58.

The CPU 41 reads out the information presentation program 50 from the storage unit 43, expands the information presentation program 50 in the memory 42, and sequentially executes the processes included in the information presentation program 50. The CPU 41 executes the clustering process 52 to work as the clustering unit 12 illustrated in FIG. 4. Furthermore, the CPU 41 executes the priority calculation process 54 to work as the priority calculation unit 14 illustrated in FIG. 4. The CPU 41 also executes the credibility calculation process 56 to work as the credibility calculation unit 16 illustrated in FIG. 4. The CPU 41 also executes the output process 58 to work as the output unit 18 illustrated in FIG. 4. This enables the computer 40 that has executed the information presentation program 50 to function as the information presentation device 10. Note that the CPU 41 that executes the program is hardware.

In addition, functions achieved by the information presentation program 50 can also be achieved, for example, by a semiconductor integrated circuit, in more detail, an application specific integrated circuit (ASIC) or the like.

The responder terminal 30 and the administrator terminal 36 can also be achieved by a computer having a CPU, a memory, a storage unit, and the like, as in the above description, and therefore detailed description thereof will be omitted.

Next, the actions of the response support system 100 according to the present embodiment will be described.

When an event such as an inquiry from a user regarding the target system occurs, the responder on the target system operation side responds to this event, and uses the responder terminal 30 to store the contents of the response in the response information DB 32 as response information. Furthermore, when the specifications or the like of the function of the target system have been changed as a response to the event, the responder uses the responder terminal 30 to store the history of the change of the target system in the change information DB 34 as change information.

Figure 10:
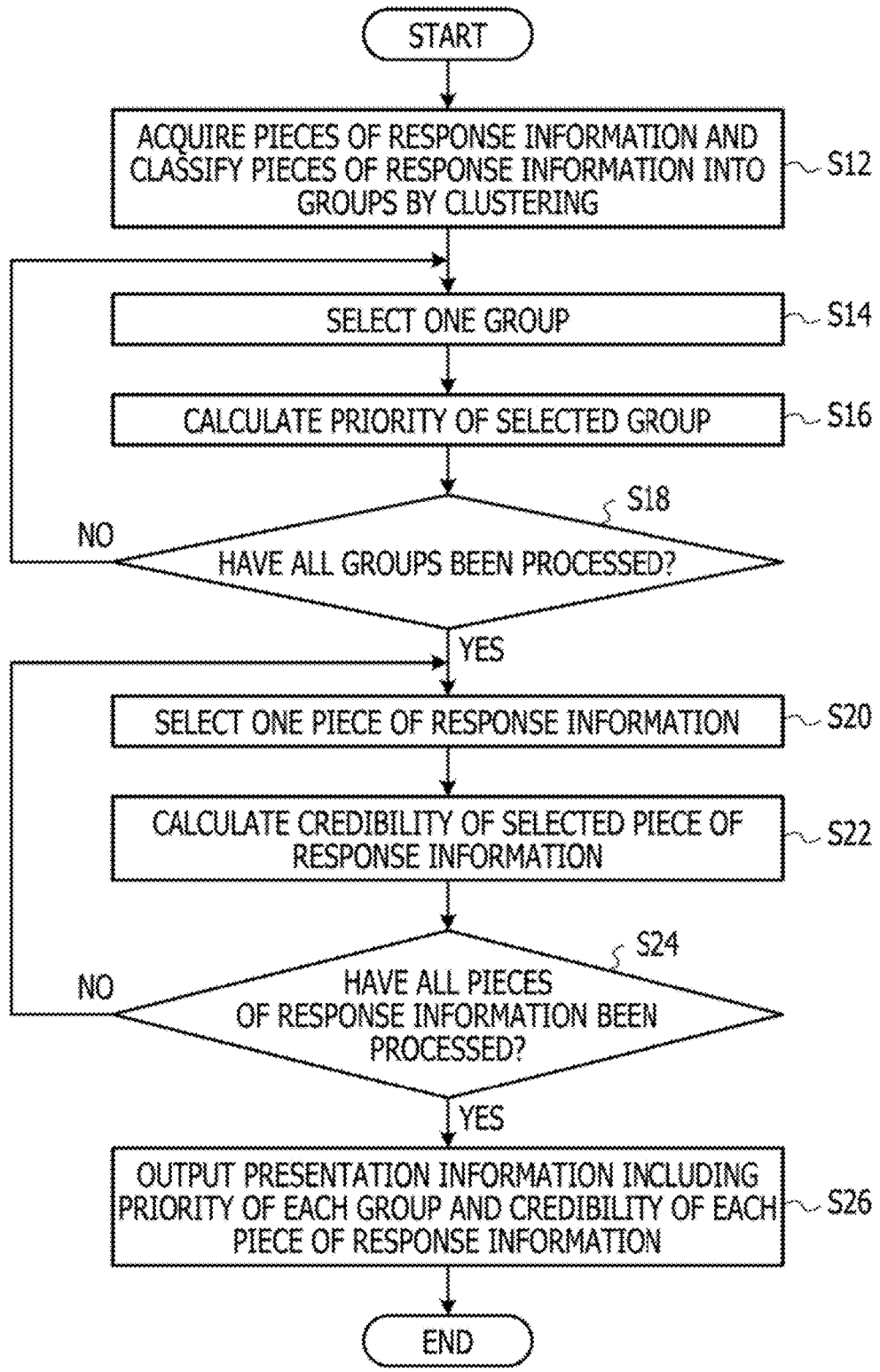
FIG. 10 is a flowchart illustrating an example of an information presentation process in the present embodiment.

Then, the information presentation device 10 executes an information presentation process illustrated in FIG. 10 at regular timings such as once a day, for example. Note that the information presentation process is an example of an information presentation method of the disclosed technology.

In step S12, the clustering unit 12 acquires a plurality of pieces of past response information stored in the response information DB 32, and clusters the acquired plurality of pieces of response information based on the similarity between the pieces of response information to classify the pieces of response information into groups. The clustering unit 12 assigns a group ID, which is identification information on the group, to each group, and associates each piece of response information with the group ID of the group to which the each piece of response information belongs, and transfers the associated response information to the priority calculation unit 14.

Next, in step S14, the priority calculation unit 14 selects one group that has not undergone the subsequent processes, from among the groups obtained by the clustering unit 12.

Next, in step S16, the priority calculation unit 14 calculates the prevalence evaluation value and the response time evaluation value for the selected group, and calculates the priority using each evaluation value.

Next, in step S18, the priority calculation unit 14 determines whether or not the process of calculating the priority has ended for all the groups classified in above step S12. When there is an unprocessed group, the process returns to step S14. On the other hand, when the process of calculating the priority has ended for all the groups, the process proceeds to step S20.

In step S20, the credibility calculation unit 16 selects one piece of response information that has not undergone the subsequent processes, from among the pieces of response information acquired in above step S12.

Next, in step S22, the credibility calculation unit 16 calculates the reference count evaluation value, the change risk evaluation value, and the freshness evaluation value for the selected piece of response information, and calculates the credibility using each evaluation value.

Next, in step S24, the credibility calculation unit 16 determines whether or not the process of calculating the credibility has ended for all pieces of the response information acquired in above step S12. Note that, when only response information belonging to a group whose priority is higher than the priority criterion is targeted, it is simply determined in this step whether or not there is unprocessed piece of response information among the response information belonging to a group whose priority is higher than the priority criterion. When there is unprocessed piece of response information, the process returns to step S20. On the other hand, when the process of calculating the credibility has ended for all pieces of the response information, the process proceeds to step S26.

In step S26, the output unit 18 outputs the presentation information including the priority of each group calculated in above step S16 and the credibility of each piece of response information calculated in above step S22, and the information presentation process ends.

The presentation information output by the information presentation process is stored in the presentation information DB 20, and is used by the administrator when knowledge is created.

As described above, according to the response support system of the present embodiment, the information presentation device clusters a plurality of pieces of response information in which the contents of a response to an event that has occurred are recorded, based on the similarity between the pieces of response information, to classify the plurality of pieces of response information into groups. The information presentation device calculates, for each of the obtained groups, the priority including evaluation based on the elapsed time from the most frequent time period of the event recorded in each piece of response information included in the group, and evaluation based on the total of times from the occurrence of the event to the completion of the response. Furthermore, the information presentation device calculates, for each piece of response information, the credibility including evaluation based on the number of times of the system change after the response, evaluation based on the elapsed time from the response date, and evaluation based on the number of times reference was made at the time of other responses. Then, the information presentation device outputs the presentation information including the priority calculated for each group and the credibility calculated for each piece of response information. Consequently, information that is useful when picking up a group for which the creation of knowledge is desired to be prioritized and when picking up response information that is desired to be employed as knowledge from the picked-up group, which is useful information that supports the creation of knowledge based on past response information, can be presented.

Note that, although a case where the credibility of each piece of response information is calculated after calculating the priority of each group has been demonstrated in the above-described embodiment, when the credibility of all pieces of response information is calculated, the embodiment is not limited to this case. The credibility of each piece of response information may be calculated first, or the calculation of the credibility of each piece of response information and the calculation of the priority of each group may be executed in parallel.

Furthermore, in the above-described embodiment, a case where the priority including the prevalence evaluation value and the response time evaluation value is calculated has been demonstrated, but the priority only needs to include at least the prevalence evaluation value. In addition, in the above-described embodiment, a case where the credibility including the reference count evaluation value, the change risk evaluation value, and the freshness evaluation value is calculated has been demonstrated, but the credibility only needs to include at least the change risk evaluation value and the freshness evaluation value.

In addition, while the above-described embodiment corresponds to a pattern in which the information presentation program is stored (installed) beforehand in the storage unit, provision of the program is not limited to this pattern. The program according to the disclosed technology can also be provided in a form stored in a storage medium such as a compact disc read only memory (CD-ROM), a digital versatile disc read only memory (DVD-ROM), or a universal serial bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information presentation program which causes a processor to perform processing, the processing comprising:

clustering a plurality of pieces of response information stored in a storage device into a plurality of groups by using similarity between the plurality of pieces of response information, each of the plurality of pieces of response information being information including a textual content representing a solution attempted as a response to an event;

determining, for each of the plurality of groups, a priority of that group by using an elapsed time that is to a current time from an end point of a time period in which the event recorded in each of plural pieces of response information included in that group has occurred most often;

calculating, for each of the plurality of pieces of response information, credibility of that response information by using a first value and a second value, the first value being a number of times specifications of a system relating to the event recorded in that response information have been changed after the response, the second value being an elapsed time from a time point when the response recorded in that response information occurred; and controlling a presentation mode by presenting all or a part of the plurality of pieces of response information, based on the priority calculated for each of the plurality of groups and the credibility calculated for each of the plurality of pieces of response information.

2. The non-transitory computer-readable storage medium according to claim 1, wherein the priority of each group is determined further based on a total time that is obtained by adding up, for each of the plural pieces of response information included in that group, a time length from occurrence of the event recorded in that response information to completion of the response recorded in that response information.

3. The non-transitory computer-readable storage medium according to claim 1, wherein the credibility of each response information is calculated further based on a number of times an access to that response information occurred upon other solutions attempted.

4. The non-transitory computer-readable storage medium claim 1, wherein one of the pieces of response information that is included in a group whose priority is higher than a first criterion defined beforehand and whose credibility is higher than a second criterion defined beforehand is presented.

5. The non-transitory computer-readable storage medium according to claim 4, wherein the credibility is calculated for one of the pieces of response information included in a group whose priority is higher than the first criterion.

6. The non-transitory computer-readable storage medium according to claim 1, wherein the pieces of response information are sorted in descending order of the priority and the credibility and presented.

7. The non-transitory computer-readable storage medium according to claim 1, wherein evaluation that is included in the priority and is based on an elapsed time from a time period in 4 which the event recorded in each of the pieces of response information included in the groups occurred most often is associated with each of the groups and presented together with the priority, and evaluation that is included in the credibility and is based on a number of times specifications of a system relating to the event were changed after the response, and evaluation that is included in the credibility and is based on an elapsed time from a time point when the response recorded in the pieces of response information was made are associated with each of the pieces of response information and presented together with the credibility.

8. An information presentation device comprising:

a memory; and a processor coupled to the memory, the processor being configured to perform processing, the processing including:

clustering a plurality of pieces of response information stored in a storage device into a plurality of groups by using similarity between the plurality of pieces of response information, each of the plurality of pieces of response information being information including a textual content representing a solution attempted as a response to an event;

determining, for each of the plurality of groups, a priority of that group by using an elapsed time that is to a current time from an end point of a time period in which the event recorded in each of plural pieces of response information included in that group has occurred most often;

calculating, for each of the plurality of pieces of response information, credibility of that response information by using a first value and a second value, the first value being a number of times specifications of a system relating to the event recorded in that response information have been changed after the response, the second value being an elapsed time from a time point when the response recorded in that response information occurred; and controlling a presentation mode by presenting all or a part of the plurality of pieces of response information, based on the priority calculated for each of the plurality of groups and the credibility calculated for each of the plurality of pieces of response information.

9. An information presentation method implemented by a computer, the method including:

clustering a plurality of pieces of response information stored in a storage device into a plurality of groups by using similarity between the plurality of pieces of response information, each of the plurality of pieces of response information being information including a textual content representing a solution attempted as a response to an event;

determining, for each of the plurality of groups, a priority of that group by using an elapsed time that is to a current time from an end point of a time period in which the event recorded in each of plural pieces of response information included in that group has occurred most often;

calculating, for each of the plurality of pieces of response information, credibility of that response information by using a first value and a second value, the first value being a number of times specifications of a system relating to the event recorded in that response information have been changed after the response, the second value being an elapsed time from a time point when the response recorded in that response information occurred; and controlling a presentation mode by presenting all or a part of the plurality of pieces of response information, based on the priority calculated for each of the plurality of groups and the credibility calculated for each of the plurality of pieces of response information.

* * * * *